(12) United States Patent
Heffner

(10) Patent No.: US 8,211,538 B2
(45) Date of Patent: Jul. 3, 2012

(54) MICROELECTRONIC SECURITY COATINGS

(75) Inventor: Kenneth H. Heffner, Largo, FL (US)

(73) Assignee: Honeywell International Inc., Morristown, NJ (US)

(*) Notice: Subject to any disclaimer, the term of this patent is extended or adjusted under 35 U.S.C. 154(b) by 98 days.

(21) Appl. No.: 12/815,775

(22) Filed: Jun. 15, 2010

(65) Prior Publication Data

US 2010/0254095 A1    Oct. 7, 2010

Related U.S. Application Data

(62) Division of application No. 10/434,440, filed on May 8, 2003, now Pat. No. 7,758,911.

(51) Int. Cl.
B32B 3/24 (2006.01)
B41M 3/14 (2006.01)
B44F 1/12 (2006.01)

(52) U.S. Cl. ............ 428/306.6; 428/901; 428/916; 427/7; 324/500

(58) Field of Classification Search .......... None
See application file for complete search history.

(56) References Cited

U.S. PATENT DOCUMENTS

| | | |
|---|---|---|
| 4,756,977 A | 7/1988 | Haluska et al. |
| 5,468,990 A | 11/1995 | Daum |
| 5,568,124 A | 10/1996 | Joyce et al. |
| 5,762,711 A | 6/1998 | Heffner et al. |
| 5,821,582 A | 10/1998 | Daum |
| 5,877,093 A | 3/1999 | Heffner et al. |
| 6,110,537 A | 8/2000 | Heffner et al. |
| 6,132,822 A | 10/2000 | Overcash et al. |
| 6,198,155 B1 | 3/2001 | Verhaegh et al. |
| 6,287,985 B1 | 9/2001 | Heffner et al. |
| 6,319,740 B1 | 11/2001 | Heffner et al. |
| 6,414,884 B1 | 7/2002 | DeFelice et al. |
| 6,496,022 B1 | 12/2002 | Kash et al. |
| 6,733,689 B1 | 5/2004 | Meyer et al. |
| 7,038,766 B2 | 5/2006 | Kerns et al. |
| 7,429,915 B2 | 9/2008 | Cruzado et al. |
| 2001/0033012 A1 | 10/2001 | Koemmlerling |
| 2001/0056542 A1 | 12/2001 | Cesana et al. |
| 2002/0199111 A1 | 12/2002 | Clark et al. |
| 2003/0066637 A1 | 4/2003 | Zimman |
| 2003/0122138 A1 | 7/2003 | Kash et al. |
| 2004/0112967 A1 | 6/2004 | Krappe et al. |
| 2004/0222802 A1 | 11/2004 | Chou et al. |

FOREIGN PATENT DOCUMENTS

| | | |
|---|---|---|
| DE | 100 65 747 A | 7/2002 |
| EP | 0972632 | 1/2000 |

OTHER PUBLICATIONS

Examination Report from corresponding EP Application No. 04751617.4, dated Jul. 29, 2010, 5 pages.
Tracking & Tracing Pharmaceutical Products, 2007, 28 pages.

*Primary Examiner* — Ramsey Zacharia
(74) *Attorney, Agent, or Firm* — Shumaker & Sieffert, P.A.

(57) ABSTRACT

A security coating on an electronic circuit assembly comprises a mesh coating that may have a unique signature pattern and comprise materials that easily produce an image of the signature so that it is possible to determine if reverse engineering has been attempted. Spaces in the mesh may include electrical components to erase circuit codes to destroy the functionality and value of the protected die if the mesh coated is disturbed. The voids may include compositions to enhance the mesh signature and abrade the circuit if tampering takes place.

20 Claims, 3 Drawing Sheets

PRIOR ART COATING

MICROELECTRONIC SECURITY COATINGS

This application is a divisional of U.S. patent application Ser. No. 10/434,440 by Kenneth H. Heffner, entitled, "MICROELECTRONIC SECURITY COATINGS" and filed on May 8, 2003, the entire content of which is incorporated herein by reference. U.S. patent application Ser. No. 10/434,440 issued as U.S. Pat. No. 7,758,911 to Heffner on Jul. 20, 2010.

BACKGROUND

This invention relates to techniques for applying security coatings to microelectronic circuits.

Coatings are applied to microelectronic circuits to restrict reverse engineering of the circuit layout and deny access to embedded codes. Coatings can provide a physical barrier that destroys the underlying components when the coating is manipulated in some fashion, e.g. cut or tampered with. Current techniques, in general, involve applying one or more single-layer or single-component coatings, e.g. as depicted in FIG. 1, where a primer 10 and a protective coating 12 cover a circuit set or die 14. Coatings may also provide a protective barrier to certain forms of electromagnetic inspection.

Despite significant strides in this area, among them the use of thermal spray to apply coatings described in U.S. Pat. Nos. 6,319740, 6,287,985, 6,110,537, 5,877,093 and 5,762,711, industry desires higher security as more valuable information is stored in electronic circuits that are increasingly used to support the economic and sustaining infrastructures of the world. The higher value information resident in electronic circuits and their designs raises the risk of unauthorized reverse engineering of the protected system and a resultant loss of valuable information through unauthorized duplication, spoofing and use of such "target devices", any electronic system that contains components that require protection from physical, chemical, electrical, acoustic or spectral methods of inspection.

SUMMARY

An object of the present invention is to provide superior security coatings for target devices.

According to the invention, instead of applying a single-component coating as a protective coating or base layer for other coatings, a mesh layer is applied, with which other coatings or features can be applied or inserted. Mesh not only improves the mechanical properties between a single component coating, the device and other security layers and components, it provides a barrier that is difficult to penetrate with invasive and non-invasive inspection processes that are often used to reverse engineer the underlying circuitry and access critical, embedded codes.

According to one aspect of the invention the mesh coating is applied randomly by hand or a programmed applicator, e.g. using Computer assisted design (CAD) deposition wherein the beaded mesh pattern is predetermined and is robotically, site directed to enable a unique pattern of deposition for each coated device or batch of devices.

According to one aspect of the invention, the mesh coating is a pre-formed sheet.

According to one aspect of the invention individual mesh elements are created according to a pre-determined or randomized pattern to produce what may be called a distinctive "signature" mesh pattern that can be read by a non-invasive inspection method. Attempts to tamper with the protected circuit will alter the signature, which can be detected by inspecting the mesh.

According to one aspect of the invention, an active device, such as a piezoelectric transducer, is inserted between one or more of the mesh elements. If the mesh is disturbed, the transducer output triggers an instruction set to the circuit to initiate an erase or corrupt sequence of the valued code in the critical software physical domain of the target device.

According to one aspect of the invention, abrasive materials are inserted in the mesh that physically damage the circuit when the mesh is disturbed.

According to another aspect of the invention, the mesh coating may be applied at another layer level of the security coating to provide a signature pattern for the coating.

According to one aspect of the invention, safe levels of alpha-emitting materials are incorporated into the mesh, providing a signature emission pattern or a serve as the basis of an embedded sensor.

According to one aspect of the invention the opened regions formed by the mesh are filled with a material different in composition and physical features from the mesh material that absorb, reflect, or diffuse acoustic and electromagnetic radiation to degrade the circuit image obtained using electromagnetic radiation imaging devices.

According to one aspect of the invention the opened regions formed by the mesh are filled with a material different in composition and physical features from the mesh material that enhance the signature character of the mesh coating.

Other objects, aspects, features, and benefits of the invention will be apparent from the description and drawings

DESCRIPTION

Figure 1:
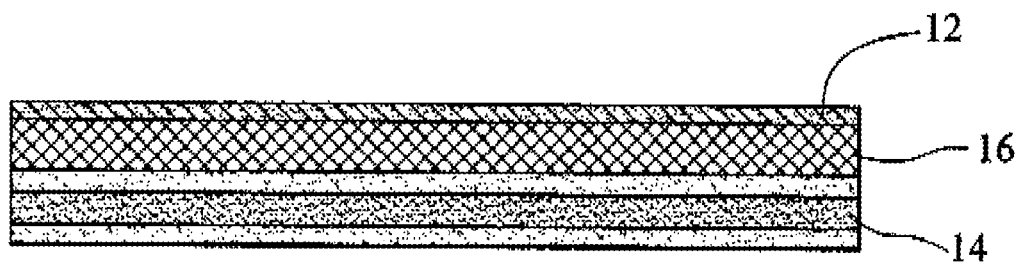
FIG. 1 shows a die that has been coded according to the prior art.
Figure 2:
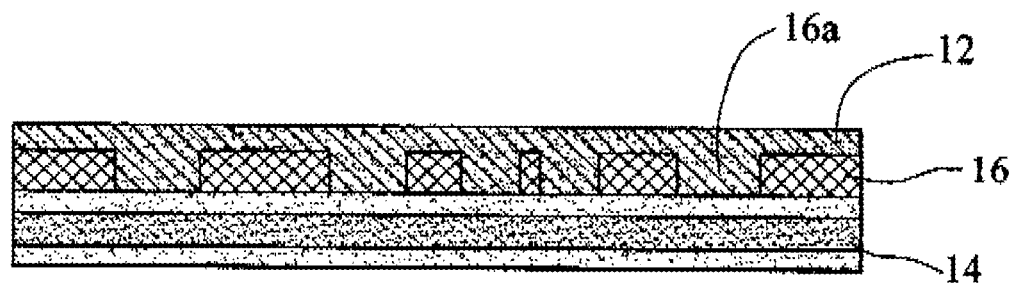
FIG. 2 shows a die coated according to the invention, using a mesh and barrier coating.
Figure 3:
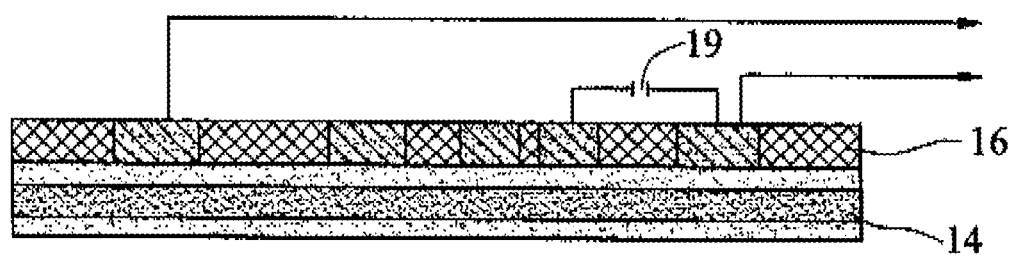
FIG. 3 shows a die covered by a mesh wherein the mesh spaces are filled with an electronic device.
Figure 4:
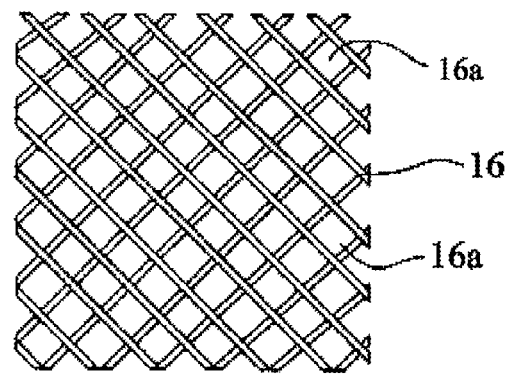
FIG. 4 is a typical plan view of a mesh pattern.

In contrast with the prior art coating shown in FIG. 1, FIGS. 2 and 3 demonstrate the use of a mesh coating 16 on a circuit or die 14. In FIG. 2, a protective coating 12 is applied that fills the spaces or voids 16a in the mesh, shown best in FIG. 4. In FIG. 3, where the protective coating 12 is also used, the voids 16a first are filled with an active electrical device 19 that produces, when disturbed, an electrical signal initiating a software instruction for erasing or corrupting all or part of stored, critical code imbedded in the circuit 14. This active device 19, in effect a sensor, may be a charged capacitor (powered component) or a piezoelectric transducer (unpowered component). A protective coating like the coating 12 in FIG. 1 can be applied over the mesh using a thermal spray method as explained the patents enumerated above. The mesh coating can also be modified to include multiple layers of meshed coatings.

Figure 5:
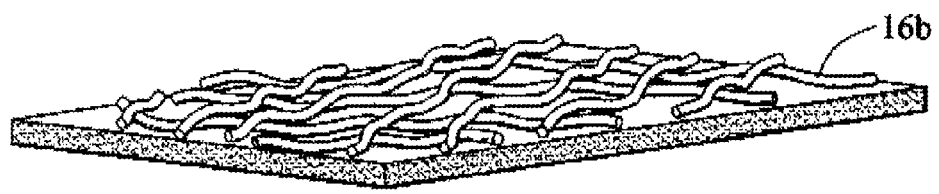
FIG. 5 is a perspective showing a mesh overlaying a die
Figure 6:
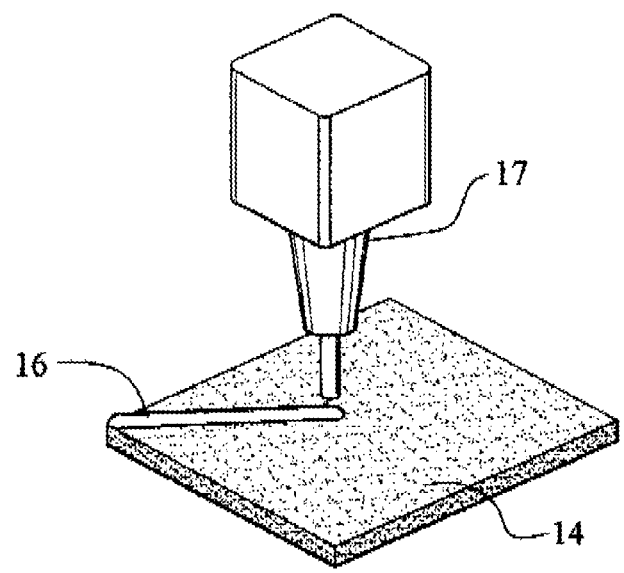
FIG. 6 shows a computer assisted design deposition of the mesh pattern.

Referring to FIG. 5, the mesh 16 may have three-dimensional characteristics; that is, the mesh is slightly elevated at points and may or may not be uniform in standoff height from the die. The pattern of the individual mesh elements 16b can follow a random or uniform pattern that results in differences in opacity, refractive index, density, hardness, molecular weight, atomic weight, dielectric constant, chemical reactivity and thermal conductivity across the mesh coating. As a result the appearance of the circuit from above the mesh coating is occluded. Thus, a meaningful image of the underlying die layout is obstructed for non-invasive and invasive inspection methods. Moreover, slicing away the mesh, an invasive inspection, will destroy portions of the die where the mesh is attached, scrambling the circuit configuration.

Figure 7:
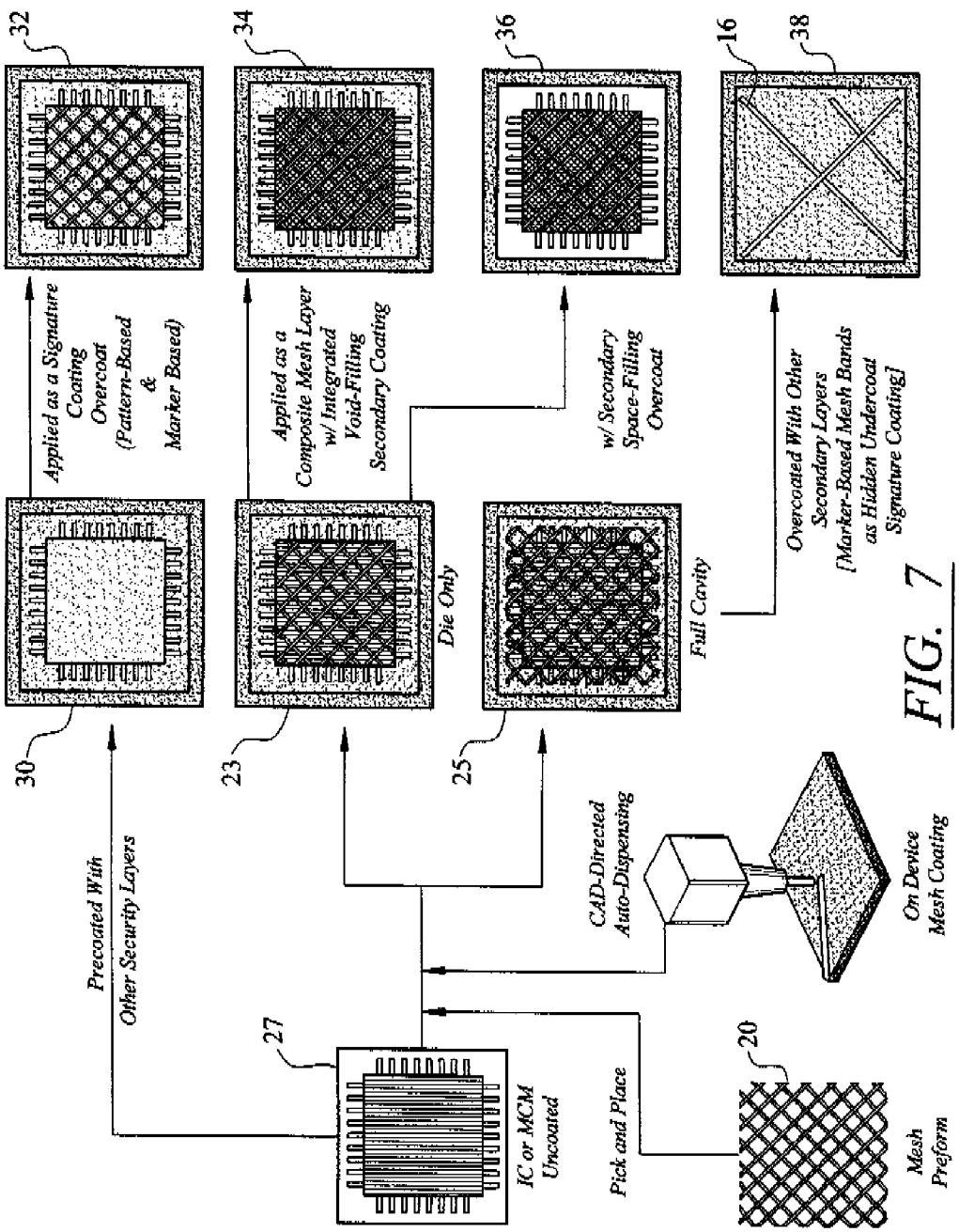
FIG. 7 shows different ways to apply a mesh to an uncoated integrated circuit or multichip module to produce different security characteristics.

Different ways to apply the mesh are shown in FIG. 7. The mesh may be a preformed material sheet 20 that is prepared to the proper size to cover just a die 23 or the full cavity 25 of the target device 27 (an uncoated integrated circuit or multichip module). The mesh may also be painted-on or sprayed-on in a random or signature (unique identifying) pattern using a CAD-controlled auto-dispenser 17. The preformed mesh 20 can also be a signature coating.

In some applications, a monolithic pre-coat 30 is applied to the device 27 which is followed by a mesh topcoat to produce the coating configuration 32, where any tampering with the mesh top coat could be detected as a change in the signature imbedded in the mesh layout.

Coating configurations 34, 36, 38 show different ways to apply an overcoat on the mesh for die-only and full or partial microelectronic assemblies (e.g. multichip modules). In configurations 34 and 36, the result is a composite mesh layer with an integrated void-filling secondary coating. The difference between the two is that in arrangement 34 the entire device 27 is coated; in the arrangement 36 just the die is coated. In coating configurations 38, the overcoat covers the entire mesh 16 and the mesh elements 16b can be marker-based, as explained below, to provide a hidden undercoat signature, in addition to the signature of the mesh pattern.

The mesh can be constructed from a single bead or from pre-formed components that may be either as a single organic or inorganic resin material or as a composite blend of resin with filler. The mesh composition should yield an adherent and coherent mixture that can be fully cured to a hardened mesh pattern (or cure as the material is deposited). The mesh material may be capable of being B-staged, permitting interaction with other coating layers and subsequent curing, yielding a hardened mesh pattern that is fused to the circuit and the overcoat coatings. The mesh coating can include a UV-fluorescent die or non-toxic levels of an alpha emitter (e.g. $^{241}$Am) that are incorporated into predetermined strands or banded patterns, producing a distinctive identifying signature pattern under light activation or by a scintillator. Materials uniquely detectable by short wave and long wave view the light or by other electromagnetic radiation detection methods may be selectively incorporated into individual mesh strands for the same purpose. Safe levels of particle-emitting materials may included in the mesh (16). The signature can be imaged from such energy emissions.

The spaces 16a in the mesh may be filled with highly abrasive particle compositions to obstruct access to critical or sensitive computer program device design information. Filler materials damage the critical elements of the target device if attempts to slice or mechanically remove the mesh 16 are made. Some or all of the spaces 16a can be filled with materials that absorb, reflect, or diffuse acoustic and electromagnetic radiation to degrade the circuit image obtained using non-intrusive imaging methods. The mesh or a material in the spaces can comprise safe levels of energy emitting materials, such as alpha particles, that can be externally detected to produce an image of the mesh signature or its outline.

One skilled in the art may make modifications, in whole or in part, to an embodiment of the invention and its various functions and components without departing from the true scope and spirit of the invention.

The invention claimed is:

1. A combination comprising:
   a circuit;
   a mesh coating deposited over the circuit in a unique pattern, wherein the mesh coating comprises a detectable signature associated therewith for detection by a non-invasive inspection method;
   alpha-emitting materials incorporated into the mesh coating, wherein the detectable signature is related to alpha emissions from the alpha-emitting materials in the mesh coating; and
   a protective coating that fills voids in the mesh coating, wherein the signature is detectable through the protective coating.

2. The combination of claim 1, wherein the protective coating is applied over the mesh coating.

3. The combination of claim 1, wherein the mesh coating comprises a plurality of mesh layers.

4. The combination of claim 1, wherein the mesh coating comprises strands of different materials.

5. The combination of claim 1, wherein the mesh coating includes a preformed material sheet.

6. The combination of claim 5, further comprising a multichip module comprising a cavity that encompasses the circuit, wherein the preformed material sheet covers the cavity.

7. The combination of claim 1, wherein the detectable signature associated with the unique pattern is due to a characteristic comprising at least one of opacity, refractive index, density, hardness, molecular weight, atomic weight, dielectric constant, chemical reactivity, or thermal conductivity.

8. The combination of claim 1, further comprising a marker within the mesh coating that produces the unique pattern resulting in the detectable signature.

9. The combination of claim 8, wherein the marker is selected from the group consisting of at least one of a UV-fluorescent material, an alpha emitter, a material detectable by electromagnetic radiation detection, and a particle emitter.

10. The combination of claim 1, wherein the mesh coating is uniformly fused to the circuit so that the circuit will be damaged if the mesh coating is removed.

11. The combination of claim 1, further comprising an active device in the mesh coating, wherein the active device causes the circuit to alter code when the mesh coating is disturbed in such a way to be detected by the active device.

12. The combination of claim 1, further comprising an abrasive material in the mesh coating, wherein disturbance to the mesh coating causes the abrasive materials to physically damage the circuit.

13. The combination of claim 1, wherein the active device comprises a charged capacitor or a piezoelectric transducer.

14. A method of using the combination of claim 1, the method comprising:
    producing an image of the mesh through the protective coating; and
    comparing the image with the detectable signature, any differences indicating that the mesh has been disturbed.

15. A method of forming the combination of claim 1, the method comprising:

applying a first coating over the circuit, wherein the first coating comprises the mesh coating and the alpha-emitting materials incorporated into the mesh coating; and
applying the protective coating over the first coating to fill the voids in the mesh coating.

16. The method of claim 15, wherein the alpha-emitting materials produce energy and the image is produced from the energy.

17. The method of claim 15, wherein the alpha-emitting materials are incorporated into strands or banded patterns that produce the detectable signature under light activation or by a scintillator, and wherein producing the image of the first coating comprises producing the image of the first coating using light activation or the scintillator.

18. The method of claim 15, further comprising applying energy to the circuit to produce the image.

19. The method of claim 15, further comprising:
producing an image of the first coating through the protective coating, wherein the signature is detectable through the protective coating; and
examining the image for characteristics of the detectable signature.

20. A method comprising:
applying a mesh coating as a topcoat to a circuit, the mesh coating having a unique pattern and comprising a signature associated therewith for detection by a non-invasive inspection method, and the mesh coating comprising alpha-emitting material, wherein the signature is related to alpha emissions from the alpha-emitting material in the mesh coating;
applying a protective coating that fills voids in the mesh coating, wherein the signature is detectable through the protective coating; and
producing an image of the mesh through the protective coating and comparing the image with the signature, any differences indicating that the mesh has been disturbed.

* * * * *